United States Patent

Decker et al.

[11] 4,042,823
[45] Aug. 16, 1977

[54] OPTICAL SCANNER

[75] Inventors: Louise A. Decker, Sunnyvale; Gary O. Langford, Palo Alto, both of Calif.

[73] Assignee: The United States of America as represented by the Secretary of the Navy, Washington, D.C.

[21] Appl. No.: 667,806

[22] Filed: Mar. 17, 1976

[51] Int. Cl.² .................................................. G02B 5/14
[52] U.S. Cl. .................................... 250/227; 350/96 B
[58] Field of Search ......... 350/6, 96 R, 96 B, 96 GN; 250/216, 227

[56] References Cited

U.S. PATENT DOCUMENTS

| 3,739,184 | 6/1973 | Katsumata et al. | 250/227 |
| 3,807,390 | 4/1974 | Ostrowski et al. | 350/96 B |
| 3,827,787 | 8/1974 | Ripart | 350/6 |
| 3,973,830 | 8/1976 | Govignon | 350/6 |

Primary Examiner—David C. Nelms
Attorney, Agent, or Firm—R. S. Sciascia; Charles D. B. Curry; Elliott N. Kramsky

[57] ABSTRACT

An optical scanner to inspect the surface of an object. A laser beam source emits a beam which is reduced in cross section, for mode matching, and caused to rotate by a series of lenses. A collimating lens focuses the rotating beam into a fiber optic cable. The beam, upon emergence from the cable, is reflected to the surface to be scanned by a reflecting cone. A detector, coupled to sensing devices, receives and interprets the surface reflections. The head portion of the cable is mounted in a crawler having a bellows at its mid-portion which enables the device to travel in a curved path, if necessary.

8 Claims, 2 Drawing Figures

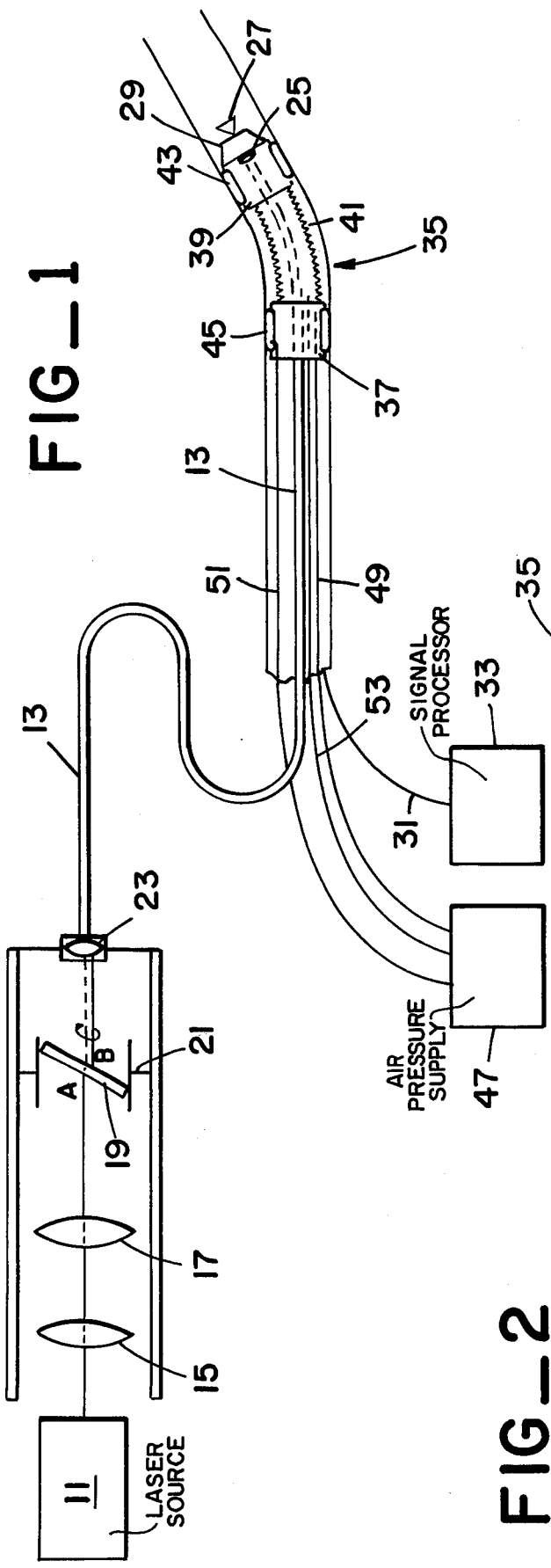
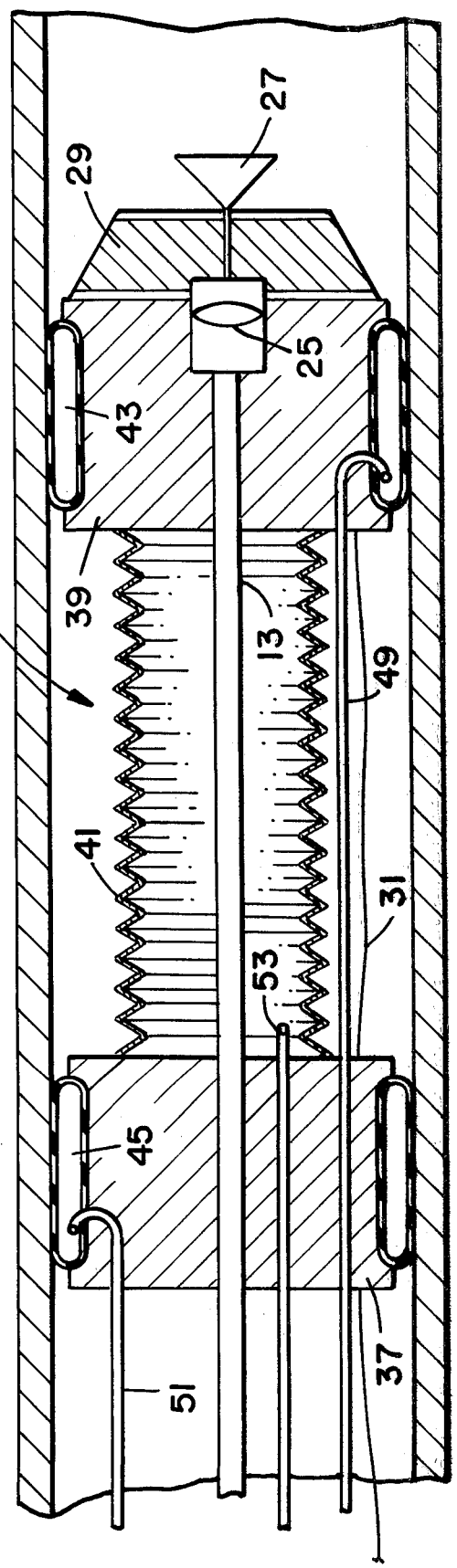

OPTICAL SCANNER

BACKGROUND OF THE INVENTION

1. Field of the Invention

The present invention relates to methods and devices for analyzing the character and properties of surfaces. In particular, it relates to devices for optically scanning otherwise inaccessible surfaces. The system is especially useful for but not limited to monitoring interior surfaces of objects, such as manifolds, for coating deficiencies, cracks and other irregularities.

2. Description of the Prior Art

Non-visual inspection of devices and materials for defects and quality control by X-rays has proved at times to be both harmful to operating technicians and destructive to the materials under inspection.

Optical scanning avoids the deleterious effects of radiation. However, optical methods require direct access of the scanning beam to the surface to be inspected. Light rays will not penetrate solid surfaces and, for most practical applications, must be considered constrained to propagate in a straight line.

Many kinds of optical scanners have achieved satisfactory operation. A drawback common to prior art scanners has been the location of moving mechanical parts near the output of the scanner. Often, such design proves undesirable in terms of space availability, maintainability and reliability.

Methods of relaying the beam away from the scanner include hard optics (conventional lenses) and fiber optics. Hard optics does not have the ability to follow curved surfaces necessary in many applications. Conventional clad optical fibers can accommodate curved surfaces but do not preserve the phase of the laser beam wavefront. Hence, a laser beam scanned at the input to the fiber will not be reproduced at the output of the fiber.

The present invention overcomes these and other drawbacks of the prior art by providing an optical scanner which includes a flexible optical cable having mode-preservation properties partially mounted on a mechanical crawler to project and scan reflected laser beam light. A system of relay optics rotates and mode matches the laser beam into the cable.

SUMMARY OF THE INVENTION

Briefly, the present invention comprises a laser beam source which emits a beam that is reduced in cross section for mode matching and caused to rotate by a series of lenses. A collimating lens focuses the rotating beam into a fiber optic cable. The beam, upon emergence from the cable, is reflected to the surface to be scanned by a reflecting cone. A detector, coupled to sensing devices, receives and interprets the surface reflections. The head portion of the cable is mounted in a crawler having a bellows at its mid-portion which enables the device to travel in a curved path, if necessary.

OBJECTS OF THE INVENTION

An object of the present invention is to provide an apparatus to inspect the interior surfaces of a semi-hollow object.

Another object of the present invention is to achieve the above object by a means which has minimal deleterious effect upon the surface to be inspected.

Yet another object of the present invention is to achieve the above object by means of a device which will pose no harm to human operators nor require special precautions and protective equipment during operation.

A further object of the present invention is to achieve the above objects by means of a device which will not require the movement of the object to be inspected.

Other objects, advantages and features of the present invention will become apparent from the following detailed description, taken together with the accompanying drawings, wherein:

BRIEF DESCRIPTION OF THE DRAWINGS

FIG. 1 is a side view of the system of the present invention; and

FIG. 2 is an enlarged side view of the crawler of the present invention.

DESCRIPTION OF THE PREFERRED EMBODIMENT

Turning first to FIG. 1, there is shown a view of the scanning system of the present invention. A laser source 11 is positioned to provide a beam input to the rest of the system. The laser source provides a coherent laser output. Such a laser source provides a high-intensity polarized output and an easily attainable 20 mil resolution spot diameter with a single mode, or Gaussian, spatial distribution. The present invention is by no means to be limited to such a resolution factor, its specifications in any particular embodiment of the invention being determined by the spectral transmission of fiber optic cable 13 and the spectral reflectivity of the surface being scanned. It has been found in operation that the Helium - Neon gas laser provides an effective and readily available laser source 11 for the scanning of a silicide coating according to the present invention.

Two convex relay lenses 15 and 17 share coaxial optical alignment with the beam emerging from laser source 11. A Gaussian Beam, $TEM_{OO}$, or fundamental laser mode, is completely characterized by the location and dimension of its beam waist. The beam waist represents the minimum diameter reached by a beam before the beam starts to diverge. A Rayleigh Region extends from somewhat in advance of the beam waist location to somewhat beyond it. Within this region the Gaussian Beam is nearly perfectly collimated. It is a property of a Gaussian Beam that is may be focused or expanded by use of a transmitting lens, remaining Gaussian after its translation so long as the transformation does not involve inducement of non-linear effects in the transmitting media.

The beam emerging from a transmitting lens is Gaussian. It thus follows that the dimension and location of the emergent beam's waist will completely describe the tranlated beam, just as such described that of the entering beam. The relay lenses 15 and 17 are so chosen with respect to focal length, separation distances, and spacing of the beam emerging from laser source 11 and rotating transmitting plate 19 that the diameter of the beam from source 11 is reduced to the desired waist size and is within its Rayleigh Region when it impinges upon the rotating transmitting plate 19.

Transmitting plate 19 is inclined at an acute angle to the optical axes discussed above. It is coupled to standard rotational means 21 which provides an angular rotation to the plate. The relay lenses 15 and 17 having been arrayed to locate the translated beam on the plate at its Rayleigh Region, a nearly perfectly collimated bundle of rays strikes the plate at an extension of the common optical axes of the relay lenses 15 and 17. Upon striking the plate, the beam, encountering a medium with a different index of refraction in a non-perpendicular fashion, is bent at an angle to the horizontal. Upon emergence from the plate, the opposite transition in indices of refraction occurs. This, coupled with the fact that the sides of the plate 19 are parallel, results in a shift of the entering collimated beam off the optical axes of the lenses 15 and 17 and from the point of entry of the beam into plate 19. The shift is illustrated with the aid of the dotted lines in FIG. 1.

The rotation of the plate 19, by constantly varying the orientation of the parallel sides of plate 19 with respect to the stationary center (point A) of the plate 19 upon which the collimated beam impinges, results in a circular variation in the point of displacement (point B) to which the incoming collimated beam is shifted. Thus, there emerges from plate 19 a rotating beam of light of approximately the same diameter as the stationary beam of light which entered the plate. The positioning of the plate in the Rayleigh Region of the incoming beam minimizes losses and distortion which might take place during travel through the plate 19.

The rotating beam next encounters a convex lens 23. Parallel rays passing through the lens are refracted through the lens and travel through its focal point. At the focus of the lens 23 there is located one end of a fiber optic cable 13 formed of a fiber light guide material such as that known by the trade name Sel-foc. This light guide has a parabolic variation in its refractive index resulting in a behavior similar to a periodic sequence of identical lenses. Its index gradient is responsible for the following transmission characteristics: unmodified polarization properties, minimized degradation of output for fiber bending in small radius of curvature, and no deformity of the mode pattern. The maintenance of mode pattern when a Gaussian Beam is applied assures that very low loss will occur within the cable 13 because the fiber will transmit the Gaussian mode without converting it into the higher order modes which have high loss.

The key feature of the cable 13 is the fact that Sel-foc acts as if it were a periodic sequence of lenses. The property of the output of such a cable to follow the input is evident. The length of the cable 13 should be so chosen that an entering beam will exit the cable 13 through the center of the end portion of cable 13. A second collimating lens 25 has a focal point which coincides with the center of the end portion of cable 13. Light emerging from the cable 13 after passing through the focus of lens 25 will be refracted to emerge from lens 25 as a beam parallel to the optical axis of the lens. The emergent beam will rotate just as the beam leaving rotating off-set lens 19 rotates due to the mode and polarization maintenance properties of the Sel-foc fiber optic cable 13.

A reflecting cone 27 is located in advance of the second collimating lens 25 to deflect the rotating beam emergent from lens 25. A detector 29 is positioned to accept the reflected light patterns generated by the interaction of the deflected rotating beam and the surface being inspected. Such devices are well known in the art. The particular one chosen is not per se the present inventive concept. It has been found during testing of the present concept that a detector of the Schottky Barrier Silicon Photodiode type provides adequate detection of silicide coating surface properties. Such a detector 29 is shown mounted within the operational system of FIG. 1. It is seen to be conical in shape and is sensitive to light incident at any point on the ring surface of the cone. A signal to noise ratio of 100 to 1 can be achieved by such a detector, which is generally adequate for intensity data processing. The data collected by the detector 29 is transferred by appropriate conducting means 31 to standard signal processing apparatus 33, appropriate for use with the particular detector 29 selected to produce a complete optical scanning system. The geometry of the cone, in terms of slope, may be varied to conform to optimal operating conditions with respect to the type of area being inspected (taking into consideration the amount of diffraction and dispersion of light likely to occur) and the particular detector 29 chosen.

The detector 29 and forward portion of the beam-scanner are mounted in a mechanical crawler 35. With particular attention to FIG. 2 it is seen that the crawler 35 is designed for flexibility, consisting of two rigid cylindrical end pieces 37 and 39 with an accordion-like bellows 41 mounted therebetween. A forward expansion tube 43 and aft expansion tube 45 encircle each of end pieces 37 and 39. The crawler 35 design is intended to enable the scanner to achieve flexure for inspection of bent geometries, flexibility for out of roundness pipe and weld discontinuities, accommodation of two pipe diameters and reversibility of operation.

The crawler 35 operates in an accordion-like motion. The expansion tubes 43 and 45 and bellows 41 are connected to air pressure device 47 by means of air tubes 49, 51 and 53.

Air pressure device 47 includes a combination of standard cooperating logic, valving and sensing devices in addition to regulated air supplies. The tubes are preferably of elastomeric material.

A crawler step is achieved by the cooperation of the expansion tubes 43 and 45, bellows 41 and air pressure device 47. Starting with expansion tubes 43 and 45 inflated, forward expansion tube 43 is deflated, bellows 41 inflated, then expansion tube 43 re-inflated. A step having been achieved at end piece 39, expansion tube 45 is deflated, bellows 41 deflated (and thus contracted in length), and expansion tube 45 reinflated, advancing the entire crawler 35 one step and reorienting it for further stepwise travel.

Thus it is seen that there is achieved a flexible optical scanner which may inspect surfaces otherwise inaccessible to non-degrading inspection techniques.

What is claimed is:

1. A scanner which comprises:
   a. a laser beam source;
   b. a relay lens to adjust the diameter of a beam emergent from said source to a predetermined dimension;
   c. an inclined plate of transparent material, said plate located in the path of said beam to cause an emerging beam to be shifted a predetermined amount in a direction parallel to said beam;
   d. rotation means to cause said plate to rotate about the point at which said beam impinges upon said plate;
   e. optical transfer means located beyond said inclined plate to intercept and transmit said emerging beam; and
   f. a reflecting cone located beyond said optical transfer means to deflect a beam emerging from said optical transfer means to the surrounding environment.

2. A scanner as described in claim 1 wherein said optical transfer means comprises:
   a. a first mode matching lens to intercept said emerging beam and redirect it to the focal point of said mode matching lens;
   b. an optic cable having the center of one end cross section located at the focus of said mode matching lens; and
   c. a second mode matching lens having its focal point at the center of the other end cross section of said optic cable.

3. A scanner as described in claim 2 wherein said scanner additionally comprises a detector proximate to said reflecting cone to receive the reflection of said rotating emergent beam from said surrounding environment.

4. A scanner as described in claim 3 wherein said scanner additionally comprises a mechanical crawler attached to said detector, said second mode matching lens and said reflecting cone to advance said scanner.

5. A scanner as described in claim 4 wherein said optic cable is composed of Sel-foc material.

6. A scanner as described in claim 5 wherein said scanner additionally comprises:
   a. said crawler having a rear cap and a head cap;
   b. said rear cap having a hole therein of larger cross section than said optic cable and through which said cable passes;
   c. said detector attached to said head cap;
   d. said second mode matching lens mounted in said head cap;
   e. a bellows mounted between said rear cap and said head cap enclosing a portion of said optic cable therein.

7. A scanner as described in claim 6 wherein said scanner also comprises:
   a. a rear inner tube surrounding said rear cap;
   b. a head inner tube surrounding said head cap;
   c. a first air tube joined at one end to said rear inner tube;
   d. a second air tube joined at one end to said head inner tube;
   e. a third air tube joined at one end to said bellows; and
   f. a logic valving and air pressure control device connected to the other end of said first, second and third air tubes to vary the air pressure within said rear head inner tubes and said bellows so that said crawler may advance at a predetermined rate.

8. A scanner as described in claim 7 wherein said detector is of the Schottky Barrier Silicon Photodiode type.

* * * * *